(12) United States Patent
Takabayashi (10) Patent No.: US 12,469,912 B2
(45) Date of Patent: Nov. 11, 2025

(54) BATTERY AND MANUFACTURING METHOD THEREOF

(71) Applicant: SANYO Electric Co., Ltd., Daito (JP)

(72) Inventor: Hiroshi Takabayashi, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 457 days.

(21) Appl. No.: 17/286,166

(22) PCT Filed: Nov. 25, 2019

(86) PCT No.: PCT/JP2019/045913
§ 371 (c)(1),
(2) Date: Apr. 16, 2021

(87) PCT Pub. No.: WO2020/110976
PCT Pub. Date: Jun. 4, 2020

(65) Prior Publication Data
US 2021/0359364 A1  Nov. 18, 2021

(30) Foreign Application Priority Data
Nov. 28, 2018  (JP) .................................. 2018-222677

(51) Int. Cl.
*H01M 50/183* (2021.01)
*H01M 10/04* (2006.01)
(Continued)

(52) U.S. Cl.
CPC ..... *H01M 50/183* (2021.01); *H01M 10/0413* (2013.01); *H01M 50/103* (2021.01);
(Continued)

(58) Field of Classification Search
CPC ............. H01M 50/183; H01M 50/103; H01M 50/463; H01M 50/474; H01M 50/477;
(Continued)

(56) References Cited

U.S. PATENT DOCUMENTS

| 9,123,918 B2* | 9/2015 | Tsutsumi | ............... H01G 11/78 |
| 2011/0236750 A1* | 9/2011 | Kohno | ............... H01M 50/474 |
| | | | 429/181 |

(Continued)

FOREIGN PATENT DOCUMENTS

| CN | 107851770 A | 3/2018 |
| CN | 108028342 A | 5/2018 |

(Continued)

OTHER PUBLICATIONS

English translation of JP 2004207089 A—provided in the IDS; Toyota motor corp; Jul. 22, 2004 (Year: 2004).*

(Continued)

*Primary Examiner* — Adam J Francis
(74) *Attorney, Agent, or Firm* — WHDA, LLP (57) ABSTRACT

A battery having an electrode assembly including a positive-electrode and a negative-electrode terminal attached to a sealing plate. The electrode assembly has surfaces parallel to a direction in which the positive and the negative electrode plates are stacked, the surfaces including one surface that faces the sealing plate. The positive and the negative electrode plate respectively include positive-electrode and a negative-electrode tabs respectively electrically connected to the positive-electrode and the negative-electrode terminals through positive-electrode and negative-electrode current collectors disposed between the electrode assembly and the sealing plate. The positive-electrode and the negative electrode tabs are welded to the respective positive-electrode and negative-electrode current collectors. A porous body that is electrically insulative is disposed between the one surface and the positive-electrode current collector and between the one surface and the negative-electrode current collector.

9 Claims, 8 Drawing Sheets

(51) Int. Cl.
- *H01M 50/103* (2021.01)
- *H01M 50/463* (2021.01)
- *H01M 50/474* (2021.01)
- *H01M 50/477* (2021.01)
- *H01M 50/489* (2021.01)
- *H01M 50/491* (2021.01)
- *H01M 50/528* (2021.01)
- *H01M 50/531* (2021.01)
- *H01M 50/543* (2021.01)
- *H01M 50/586* (2021.01)
- *H01M 50/593* (2021.01)

(52) U.S. Cl.
CPC ....... *H01M 50/463* (2021.01); *H01M 50/474* (2021.01); *H01M 50/477* (2021.01); *H01M 50/489* (2021.01); *H01M 50/491* (2021.01); *H01M 50/531* (2021.01); *H01M 50/543* (2021.01); *H01M 50/586* (2021.01); *H01M 50/593* (2021.01); *H01M 50/528* (2021.01)

(58) Field of Classification Search
CPC ............. H01M 50/489; H01M 50/491; H01M 50/531; H01M 50/543; H01M 50/586; H01M 50/593; H01M 50/528; H01M 50/48; H01M 50/55; H01M 50/627; H01M 10/0413; H01M 10/04; H01M 10/0585; Y02P 70/50; Y02E 60/10
See application file for complete search history.

(56) References Cited

U.S. PATENT DOCUMENTS

| | | | | |
|---|---|---|---|---|
| 2012/0052360 A1* | 3/2012 | Fujiwara | ........... | H01M 10/0413 429/153 |
| 2014/0287296 A1* | 9/2014 | Ha | ............. | H01M 50/491 429/144 |
| 2015/0340663 A1* | 11/2015 | Minagata | ............. | H01M 50/119 429/163 |
| 2016/0036009 A1* | 2/2016 | Cho | ............. | B23K 26/244 219/121.72 |
| 2016/0294017 A1* | 10/2016 | Ebisuzaki | ........ | H01M 10/0525 |
| 2016/0336545 A1* | 11/2016 | Wakimoto | .......... | H01M 50/578 |
| 2018/0269523 A1 | 9/2018 | Kawate et al. | | |
| 2019/0013507 A1* | 1/2019 | Shinyashiki | .......... | H01M 50/54 |
| 2019/0312253 A1 | 10/2019 | Wakimoto et al. | | |

FOREIGN PATENT DOCUMENTS

| | | | |
|---|---|---|---|
| JP | 2004-207089 A | | 7/2004 |
| JP | 2009-87812 A | | 4/2009 |
| JP | 2011-198663 A | | 10/2011 |
| JP | 2014041724 A | * | 3/2014 |
| JP | 2014-220197 A | | 11/2014 |
| WO | 2017/047787 A1 | | 3/2017 |
| WO | 2018/062338 A1 | | 4/2018 |

OTHER PUBLICATIONS

English Translation of JP 2014041724 A—Power storage device, and method for manufacturing electrode assembly; Toyota IND Corp; Mar. 6, 2014 (Year: 2014).*

International Search Report dated Feb. 18, 2020, issued in counterpart application No. PCT/JP2019/045913, with English translation. (4 pages).

English Translation of Chinese Search Report dated Dec. 5, 2023, issued in counterpart CN Patent Application No. 201980071840.8. (4 pages).

English Translation of Search Report dated Aug. 22, 2024, issued in counterpart CN Application No. 201980071840.8. (3 pages).

* cited by examiner

BATTERY AND MANUFACTURING METHOD THEREOF

TECHNICAL FIELD

The present invention relates to a battery and a method for manufacturing the battery.

BACKGROUND ART

Batteries, such as alkaline secondary batteries and non-aqueous electrolyte secondary batteries, are used in, for example, driving power sources of electric vehicles (EVs) and hybrid electric vehicles (HEVs, PHEVs) and stationary storage battery systems for, for example, reducing variations in outputs of solar power generation, wind power generation, etc., or performing peak-shifting of grid power by storing electric power at night and using the stored power during the day.

The above-described batteries may allow entry of foreign matter during assembly thereof. When the foreign matter that has entered is metal foreign matter, there is a risk that internal short-circuiting will occur. Internal short-circuiting occurs by the following mechanism. First, the metal foreign matter adheres to the material of a positive electrode and dissolves into electrolytic solution in the form of metal ions due to the high potential of the positive electrode. When the metal ions reach a negative electrode, the metal ions are deposited on the negative electrode as a metal. The metal grows toward the positive electrode, penetrates through a separator, and comes into contact with the positive electrode. As a result, internal short-circuiting occurs.

A secondary battery is generally assembled in a clean room to prevent entry of foreign matter, such as metal foreign matter, into the battery. During assembly, metal foreign matter that has adhered to an electrode assembly is generally removed by, for example, blowing air, applying suction or magnetic attraction, or wiping with an abrasive tape.

PTL 1 proposes a sealed battery in which an electrode assembly is inserted in a bag-shaped porous body and in which the porous body having the electrode assembly inserted therein is inserted in a sealed container.

CITATION LIST

Patent Literature

PTL 1: Japanese Published Unexamined Patent Application No. 2009-87812

SUMMARY OF INVENTION

Technical Problem

However, PTL 1 does not specifically describe a method for placing the porous body between the electrode assembly and a lid of the sealed container or merits thereof, and the method is unknown.

The present invention has been made in light of the above-described circumstances, and its object is to provide a battery capable of effectively blocking entry of foreign matter into an electrode assembly.

Solution to Problem

A battery according to the present invention includes an electrode assembly including a positive electrode plate and a negative electrode plate that are stacked together with a separator interposed therebetween; an exterior body that has an opening and contains the electrode assembly; a sealing plate that seals the opening; and a positive-electrode external terminal and a negative-electrode external terminal that are attached to the sealing plate. The sealing plate has an introduction hole through which electrolytic solution is introduced into the exterior body. The electrode assembly has surfaces parallel to a direction in which the positive electrode plate and the negative electrode plate are stacked, the surfaces including one surface that faces the sealing plate. The positive electrode plate includes a positive-electrode tab that is adjacent to the one surface and protrudes from the one surface, the positive-electrode tab being electrically connected to the positive-electrode external terminal through a positive-electrode current collector disposed between the electrode assembly and the sealing plate. The negative electrode plate includes a negative-electrode tab that is adjacent to the one surface and protrudes from the one surface, the negative-electrode tab being electrically connected to the negative-electrode external terminal through a negative-electrode current collector disposed between the electrode assembly and the sealing plate. The positive-electrode tab is welded to the positive-electrode current collector. The negative-electrode tab is welded to the negative-electrode current collector. A porous body that is electrically insulative is disposed between the one surface and the positive-electrode current collector and between the one surface and the negative-electrode current collector.

The porous body may also be disposed on another one or more of the surfaces of the electrode assembly that are parallel to the direction in which the positive electrode plate and the negative electrode plate are stacked.

The electrode assembly may include a first electrode assembly element including the positive electrode plate and the negative electrode plate and a second electrode assembly element including the positive electrode plate and the negative electrode plate. The first electrode assembly element includes a first positive-electrode tab group including a plurality of the positive-electrode tabs and a first negative-electrode tab group including a plurality of the negative-electrode tabs. The second electrode assembly element includes a second positive-electrode tab group including a plurality of the positive-electrode tabs and a second negative-electrode tab group including a plurality of the negative-electrode tabs. The first positive-electrode tab group and the second positive-electrode tab group are each welded to the positive-electrode current collector. The first negative-electrode tab group and the second negative-electrode tab group are each welded to the negative-electrode current collector. The porous body provided on a surface of the first electrode assembly element that forms the one surface and the porous body provided on a surface of the second electrode assembly element that forms the one surface are different from each other.

The first electrode assembly element and the second electrode assembly element may have the same structure.

In addition, porous bodies that are different from each other mean porous bodies provided as separate independent components. Therefore, the porous bodies that are different from each other may have the same structure.

An insulating sheet may be disposed between the exterior body and the electrode assembly.

The porous body may be made of non-woven fabric.

Side edge portions of the or each positive-electrode tab and the or each negative-electrode tab that protrude from the one surface may be at least partially covered by the porous body.

A method for manufacturing a battery according to the present invention includes a step of forming an electrode assembly by stacking a positive electrode plate including a positive-electrode tab and a negative electrode plate including a negative-electrode tab with a separator interposed therebetween; a step of covering, with a porous body that is electrically insulative, at least a surface of the electrode assembly at which the positive-electrode tab and the negative-electrode tab are disposed, the surface being one of surfaces of the electrode assembly that are parallel to a direction in which the positive electrode plate and the negative electrode plate are stacked; a step of welding the positive-electrode tab to a positive-electrode current collector and welding the negative-electrode tab to a negative-electrode current collector; a step of electrically connecting the positive-electrode current collector to a positive-electrode external terminal and electrically connecting the negative-electrode current collector to a negative-electrode external terminal; a step of inserting the electrode assembly into an exterior body having an opening and sealing the opening with a sealing plate; and a step of introducing electrolytic solution into the exterior body through an introduction hole in the sealing plate.

Another method for manufacturing a battery according to the present invention includes a step of forming a first electrode assembly element by stacking a positive electrode plate including a positive-electrode tab and a negative electrode plate including a negative-electrode tab with a separator interposed therebetween; a step of forming a second electrode assembly element by stacking a positive electrode plate including a positive-electrode tab and a negative electrode plate including a negative-electrode tab with a separator interposed therebetween; a step of covering, with a porous body that is electrically insulative, at least a surface of the first electrode assembly element at which the positive-electrode tab and the negative-electrode tab are disposed, the surface being one of surfaces of the first electrode assembly element that are parallel to a direction in which the positive electrode plate and the negative electrode plate are stacked; a step of covering, with a porous body that is electrically insulative, at least a surface of the second electrode assembly element at which the positive-electrode tab and the negative-electrode tab are disposed, the surface being one of surfaces of the second electrode assembly element that are parallel to a direction in which the positive electrode plate and the negative electrode plate are stacked; a step of welding the positive-electrode tab of the first electrode assembly element to a positive-electrode current collector and welding the negative-electrode tab of the first electrode assembly element to a negative-electrode current collector; a step of electrically connecting the positive-electrode current collector to a positive-electrode external terminal and electrically connecting the negative-electrode current collector to a negative-electrode external terminal; and a step of bringing the first electrode assembly element and the second electrode assembly element together.

Advantageous Effects of Invention

The battery according to the present invention is structured such that a porous body is disposed between the sealing plate and a surface that faces the sealing plate, the surface being one of surfaces of the electrode assembly that are parallel to the direction in which the positive electrode plate and the negative electrode plate are stacked. Therefore, when metal foreign matter is generated in response to welding of the positive-electrode tab and the negative-electrode tab, which protrude from the surface, to the positive-electrode current collector and the negative-electrode current collector, respectively, entry of the metal foreign matter into the electrode assembly through spaces between the layers at the surface can be effectively blocked.

DESCRIPTION OF EMBODIMENTS

Embodiments of the present invention will now be described in detail with reference to the drawings. The following description of the preferred embodiments are basically merely exemplary, and is not intended to limit the present invention, applications thereof, or use thereof. In the drawings referred to below, components having substantially the same functions are denoted by the same reference signs to simplify the description.

First Embodiment

The structure of a rectangular secondary battery 20 will now be described as a secondary battery according to a first embodiment. The present invention is not limited to the embodiment described below.

Figure 1:
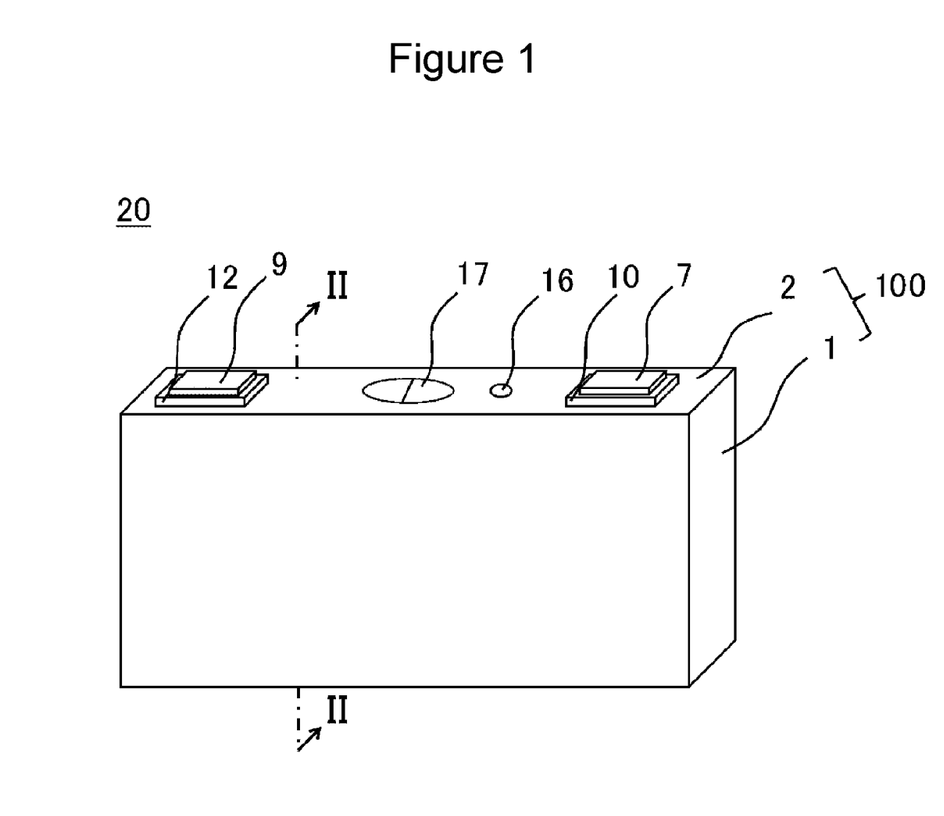
FIG. 1 is a perspective view of a secondary battery according to an embodiment.
Figure 2:
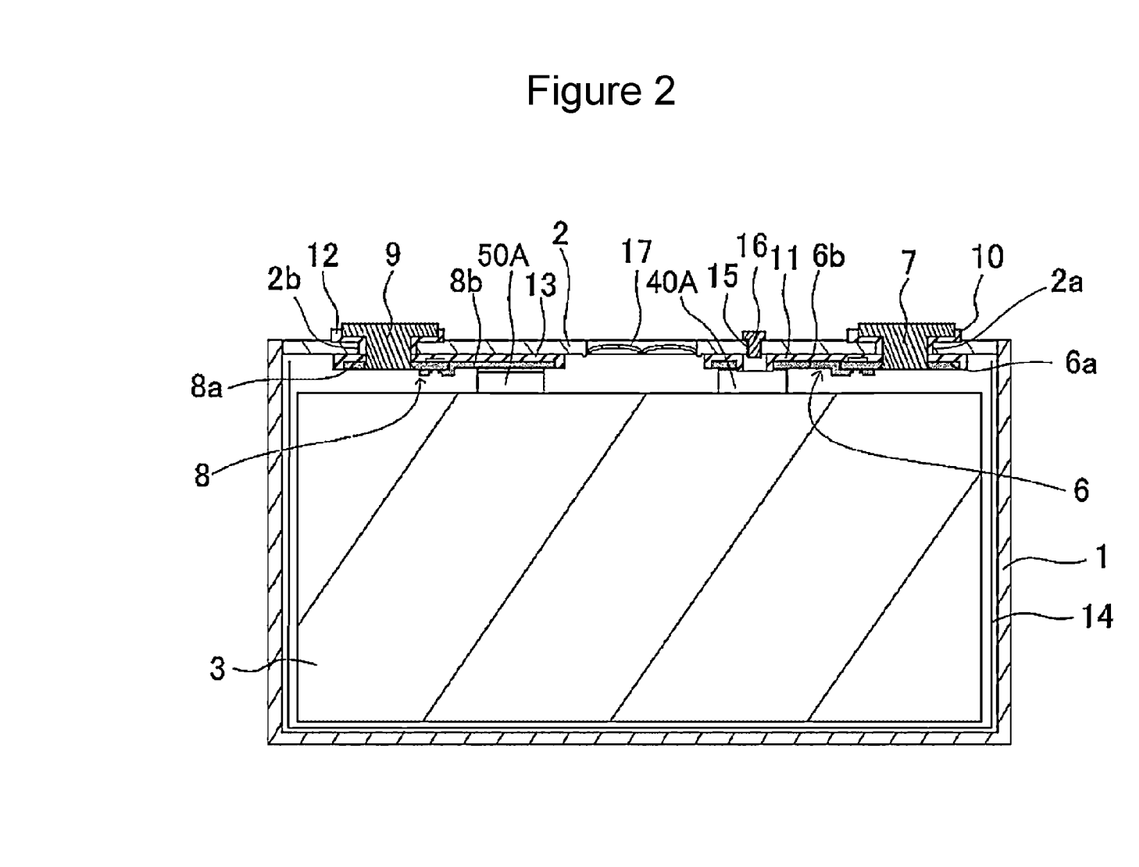
FIG. 2 is a sectional view taken along line II-II in FIG. 1.

As illustrated in FIGS. 1 and 2, the rectangular secondary battery 20 includes a battery case 100 including a rectangular exterior body 1 having the shape of a rectangular tube with an opening and a bottom and a sealing plate 2 that seals the opening in the rectangular exterior body 1. The rectangular exterior body 1 and the sealing plate 2 are preferably made of metal. The rectangular exterior body 1 contains an electrode assembly 3, which includes positive electrode plates and negative electrode plates, together with an electrolyte. As described below, in the present embodiment, the electrode assembly 3 is composed of a first electrode assembly element and a second electrode assembly element. These two electrode assembly elements have the same structure.

The electrode assembly 3 includes positive-electrode tab groups 40A which each include a plurality of positive-electrode tabs 40 and negative-electrode tab groups 50A which each include a plurality of negative-electrode tabs 50 at an end thereof adjacent to the sealing plate 2. The positive-electrode tab groups 40A are electrically connected to a positive-electrode terminal 7 by a second positive-electrode current collector (positive-electrode current collector) 6b and a first positive-electrode current collector 6a. The negative-electrode tab groups 50A are electrically connected to a negative-electrode terminal 9 by a second negative-electrode current collector (negative-electrode current collector) 8b and a first negative-electrode current collector 8a.

The first positive-electrode current collector 6a, the second positive-electrode current collector 6b, and the positive-electrode terminal 7 are preferably made of metal, more preferably aluminum or an aluminum alloy. An outer insulating member 10 made of resin is disposed between the positive-electrode terminal 7 and the sealing plate 2. An inner insulating member 11 made of resin is disposed between the first positive-electrode current collector 6a and the sealing plate 2 and between the second positive-electrode current collector 6b and the sealing plate 2.

The first negative-electrode current collector 8a, the second negative-electrode current collector 8b, and the negative-electrode terminal 9 are preferably made of metal, more preferably copper or a copper alloy. The negative-electrode terminal 9 preferably includes a portion made of aluminum or an aluminum alloy and a portion made of copper or a copper alloy. In this case, preferably, the portion made of copper or a copper alloy is connected to the first negative-electrode current collector 8a, and the portion made of aluminum or an aluminum alloy projects outward beyond the sealing plate 2. An outer insulating member 12 made of resin is disposed between the negative-electrode terminal 9 and the sealing plate 2. An inner insulating member 13 made of resin is disposed between the first negative-electrode current collector 8a and the sealing plate 2 and between the second negative-electrode current collector 8b and the sealing plate 2.

An electrode assembly holder 14 formed of a resin sheet made of resin is disposed between the electrode assembly 3 and the rectangular exterior body 1. The electrode assembly holder 14 is preferably formed by folding an insulating sheet made of resin in the shape of a bag or a box. The electrode assembly holder 14 ensures electrical insulation between the electrode assembly 3 and the rectangular exterior body 1. To reliably prevent the electrode assembly 3 and the rectangular exterior body 1 from coming into contact with each other, the electrode assembly holder 14 preferably has no pores. In other words, the electrode assembly holder 14 is preferably non-porous.

The sealing plate 2 has an electrolytic solution introduction hole 15. The electrolytic solution introduction hole 15 is sealed with a sealing member 16. The sealing plate 2 is provided with a gas discharge valve 17 that breaks to enable gas in the battery case 100 to be discharged from the battery case 100 when the pressure in the battery case 100 reaches or exceeds a predetermined pressure.

A method for manufacturing the rectangular secondary battery 20 and each structure of the rectangular secondary battery 20 will now be described in detail.

[Positive Electrode Plate]

A method for manufacturing a positive electrode plate will now be described.

[Production of Positive-Electrode-Active-Material Mixture Layer Slurry]

A positive-electrode-active-material mixture layer slurry is produced by mixing a lithium nickel cobalt manganese composite oxide that serves as a positive electrode active material, polyvinylidene fluoride (PVdF) that serves as a binder, a carbon material that serves as a conductive agent, and N-methyl-2-pyrrolidone (NMP) that serves as a dispersion medium so that the mass ratio between the lithium nickel cobalt manganese composite oxide, PVdF, and the carbon material is 97.5:1:1.5.

[Production of Positive-Electrode-Protecting Layer Slurry]

A protecting layer slurry is produced by mixing alumina powder, graphite that serves as a conductive agent, polyvinylidene fluoride (PVdF) that serves as a binder, and N-methyl-2-pyrrolidone (NMP) that serves as a dispersion medium so that the mass ratio between the alumina powder, graphite, and PVdF is 83:3:14.

[Formation of Positive-Electrode-Active-Material Mixture Layers and Positive-Electrode Protecting Layers]

The positive-electrode-active-material mixture layer slurry and the positive-electrode-protecting layer slurry produced by the above-described methods are applied to both sides of an aluminum foil, which serves as a positive electrode core and has a thickness of 15 μm, by using a die coater. The positive-electrode-active-material mixture layer slurry is applied in a central region of the positive electrode core in a width direction. The positive-electrode-protecting layer slurry is applied in regions on both sides of the region in which the positive-electrode-active-material mixture layer slurry is applied in the width direction.

Figure 3:
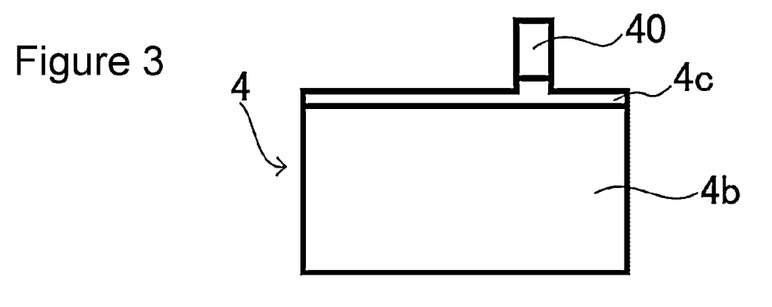
FIG. 3 is a plan view of a positive electrode plate.

The positive electrode core to which the positive-electrode-active-material mixture layer slurry and the positive-electrode-protecting layer slurry are applied is dried to remove NMP contained in the slurries. Thus, positive-electrode-active-material mixture layers 4b and protecting layers 4c are formed. After that, the positive-electrode-active-material mixture layers 4b are compressed by being passed between a pair of press rollers, so that a positive electrode original plate is formed. The positive electrode original plate is cut into a predetermined size.

FIG. 3 is a plan view of a positive electrode plate 4.

[Negative Electrode Plate]

A method for manufacturing a negative electrode plate will now be described.

[Production of Negative-Electrode-Active-Material Mixture Layer Slurry]

A negative-electrode-active-material mixture layer slurry is produced by mixing graphite that serves as a negative electrode active material, styrene butadiene rubber (SBR) and carboxymethyl cellulose (CMC) that serve as a binder, and water that serves as a dispersion medium so that the mass ratio between graphite, SBR, and CMC is 98:1:1.

[Formation of Negative-Electrode-Active-Material Mixture Layers]

The negative-electrode-active-material mixture layer slurry produced by the above-described method is applied to both sides of a copper foil, which serving as a negative electrode core and has a thickness of 8 µm, by using a die coater.

Figure 4:
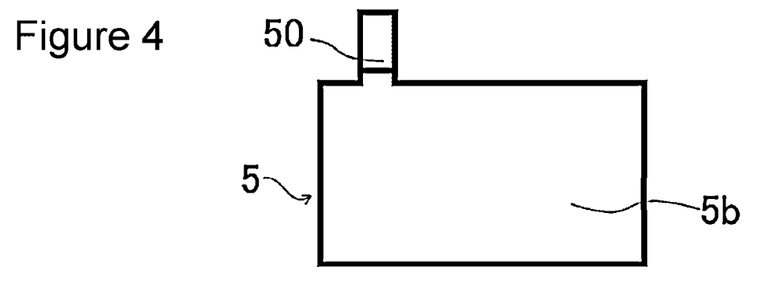
FIG. 4 is a plan view of a negative electrode plate.

The negative electrode core to which the negative-electrode-active-material mixture layer slurry is applied is dried to remove water contained in the slurry. Thus, negative-electrode-active-material mixture layers 5b are formed. After that, the negative-electrode-active-material mixture layers 5b are compressed by being passed between a pair of press rollers, so that a negative electrode original plate is formed. The negative electrode original plate is cut into a predetermined size.

FIG. 4 is a plan view of a negative electrode plate 5.

[Production of Electrode Assembly]

Figure 5:
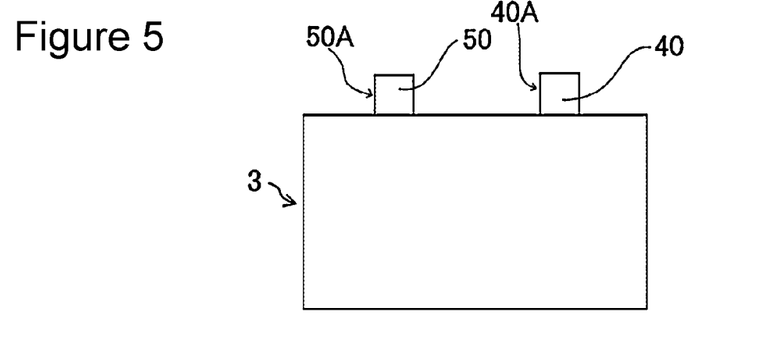
FIG. 5 is a plan view of an electrode assembly according to the embodiment.

The electrode assembly 3 having a stacked structure is manufactured by stacking positive electrode plates 4 and negative electrode plates 5, which are produced by the above-described methods, with separators interposed therebetween. FIG. 5 is a plan view of the electrode assembly 3. The electrode assembly 3 includes the positive-electrode tab groups 40A which each include the plurality of positive-electrode tabs 40 and the negative-electrode tab groups 50A which each include the plurality of negative-electrode tabs 50 at one end thereof.

In addition, as described below, porous bodies are disposed on stack end surfaces of the electrode assembly 3 (surfaces at which end surfaces of the positive electrode plates 4 and the negative electrode plates 5 are exposed and that are parallel to the direction in which the positive electrode plates 4 and the negative electrode plates 5 are stacked).

[Connection between Current Collectors and Tabs]

Figure 6:
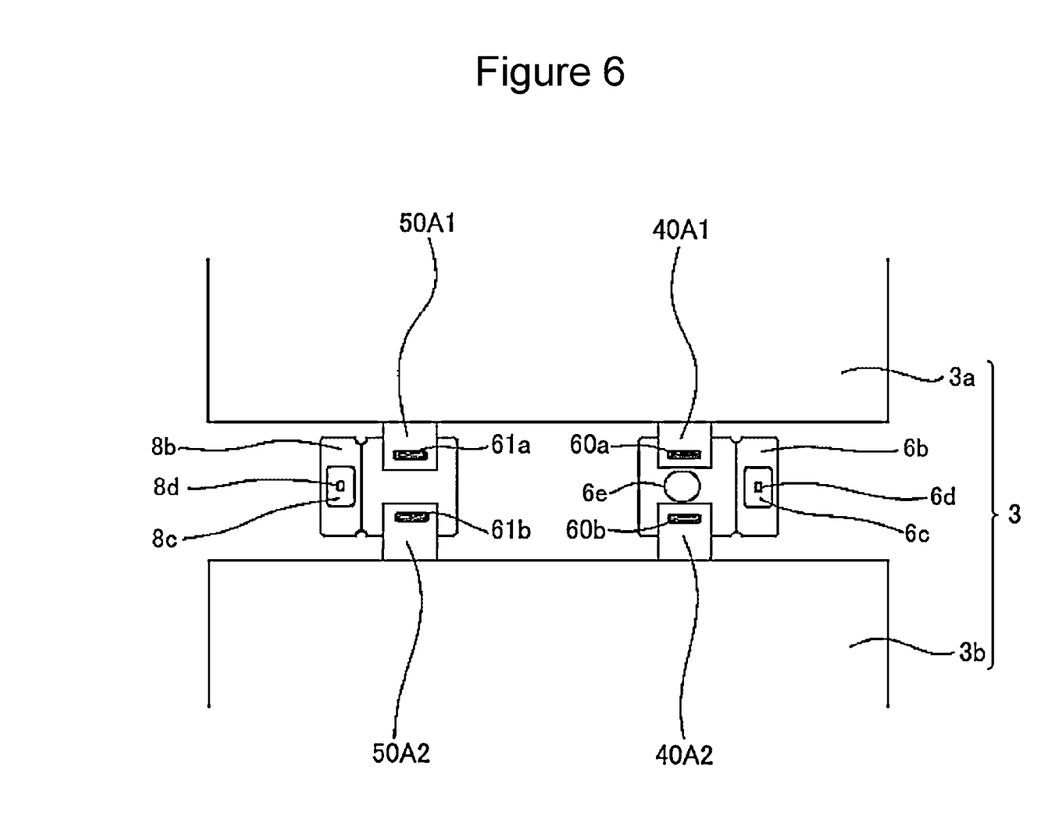
FIG. 6 illustrates a state in which positive-electrode tab groups are connected to a second positive-electrode current collector and negative-electrode tab groups are connected to a second negative-electrode current collector.

In the present embodiment, as illustrated in FIG. 6, the electrode assembly 3 is composed of a first electrode assembly element 3a and a second electrode assembly element 3b. The first electrode assembly element 3a and the second electrode assembly element 3b are produced by the same method as the above-described method for producing the electrode assembly 3.

A first positive-electrode tab group 40A1 of the first electrode assembly element 3a and a second positive-electrode tab group 40A2 of the second electrode assembly element 3b are connected to the second positive-electrode current collector (positive-electrode current collector) 6b, and a first negative-electrode tab group 50A1 of the first electrode assembly element 3a and a second negative-electrode tab group 50A2 of the second electrode assembly element 3b are connected to the second negative-electrode current collector (negative-electrode current collector) 8b. The first and second positive-electrode tab groups 40A1 and 40A2 are welded to the second positive-electrode current collector 6b so that welded connection portions 60a and 60b are formed. The negative-electrode tab groups 50A1 and 50A2 are welded to the second negative-electrode current collector 8b so that welded connection portions 61a and 61b are formed.

The second positive-electrode current collector 6b includes a thin portion 6c, and a current-collector opening 6d is formed in the thin portion 6c. The second positive-electrode current collector 6b is connected to the first positive-electrode current collector 6a at the thin portion 6c. The second positive-electrode current collector 6b has a current-collector through hole 6e located to face the electrolytic solution introduction hole 15 in the sealing plate 2.

The second negative-electrode current collector 8b includes a thin portion 8c, and a current-collector opening 8d is formed in the thin portion 8c. The second negative-electrode current collector 8b is connected to the first negative-electrode current collector 8a at the thin portion 8c.

The positive-electrode tab groups 40A may be connected to the second positive-electrode current collector 6b by, for example, ultrasonic welding, resistance welding, or laser welding.

[Attachment of Components to Sealing Plate]

Figure 7:
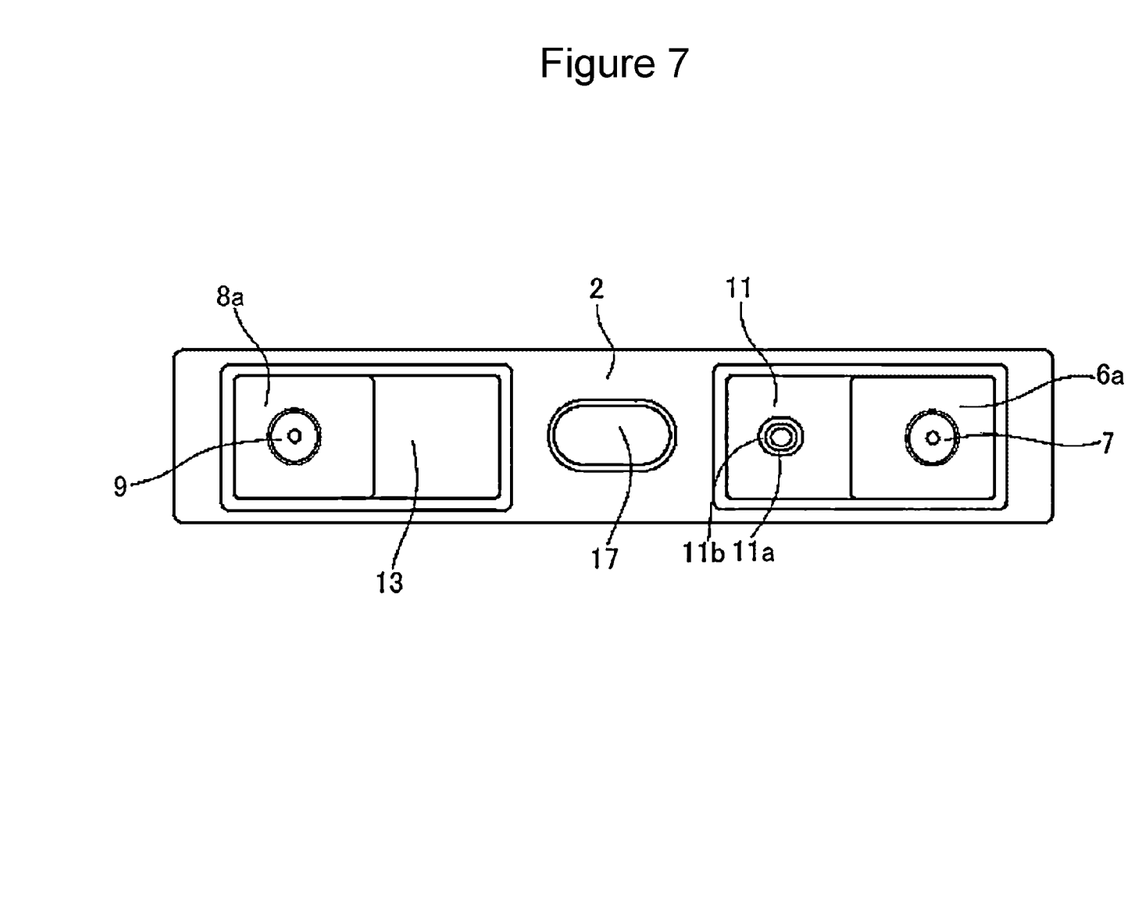
FIG. 7 illustrates a surface of a sealing plate facing the electrode assembly after a first positive-electrode current collector and a first negative-electrode current collector are attached thereto.

FIG. 7 illustrates a surface of the sealing plate 2 that faces the inside of the battery and to which components are attached. The components are attached to the sealing plate 2 as described below.

The outer insulating member 10 is disposed on a surface of the sealing plate 2 that faces the outside of the battery in a region around a positive-electrode-terminal-receiving hole 2a. The inner insulating member 11 and the first positive-electrode current collector 6a are disposed on the surface of the sealing plate 2 that faces the inside of the battery in a region around the positive-electrode-terminal-receiving hole 2a. The positive-electrode terminal 7 is inserted through a through hole in the outer insulating member 10, the positive-electrode-terminal-receiving hole 2a in the sealing plate 2, a through hole in the inner insulating member 11, and a terminal connection hole in the first positive-electrode current collector 6a from the outside of the battery, and an end of the positive-electrode terminal 7 is crimped onto the first positive-electrode current collector 6a. Thus, the positive-electrode terminal 7 and the first positive-electrode current collector 6a are fixed to the sealing plate 2. The crimped portion of the positive-electrode terminal 7 and the first positive-electrode current collector 6a are preferably welded to each other.

The outer insulating member 12 is disposed on the surface of the sealing plate 2 that faces the outside of the battery in a region around a negative-electrode-terminal-receiving hole 2b. The inner insulating member 13 and the first negative-electrode current collector 8a are disposed on the surface of the sealing plate 2 that faces the inside of the battery in a region around the negative-electrode-terminal-receiving hole 2b. The negative-electrode terminal 9 is inserted through a through hole in the outer insulating member 12, the negative-electrode-terminal-receiving hole 2b in the sealing plate 2, a through hole in the inner insulating member 13, and a terminal connection hole in the first negative-electrode current collector 8a from the outside of the battery, and an end of the negative-electrode terminal 9 is crimped onto the first negative-electrode current collector 8a. Thus, the negative-electrode terminal 9 and the first negative-electrode current collector 8a are fixed to the sealing plate 2. The crimped portion of the negative-electrode terminal 9 and the first negative-electrode current collector 8a are preferably welded to each other.

The inner insulating member 11 has an introduction opening 11a located to face the electrolytic solution introduction hole 15 in the sealing plate 2. The introduction opening 11a has a tubular portion 11b along the edge thereof.

[Connection between First Current Collectors and Second Current Collectors]

Figure 8:
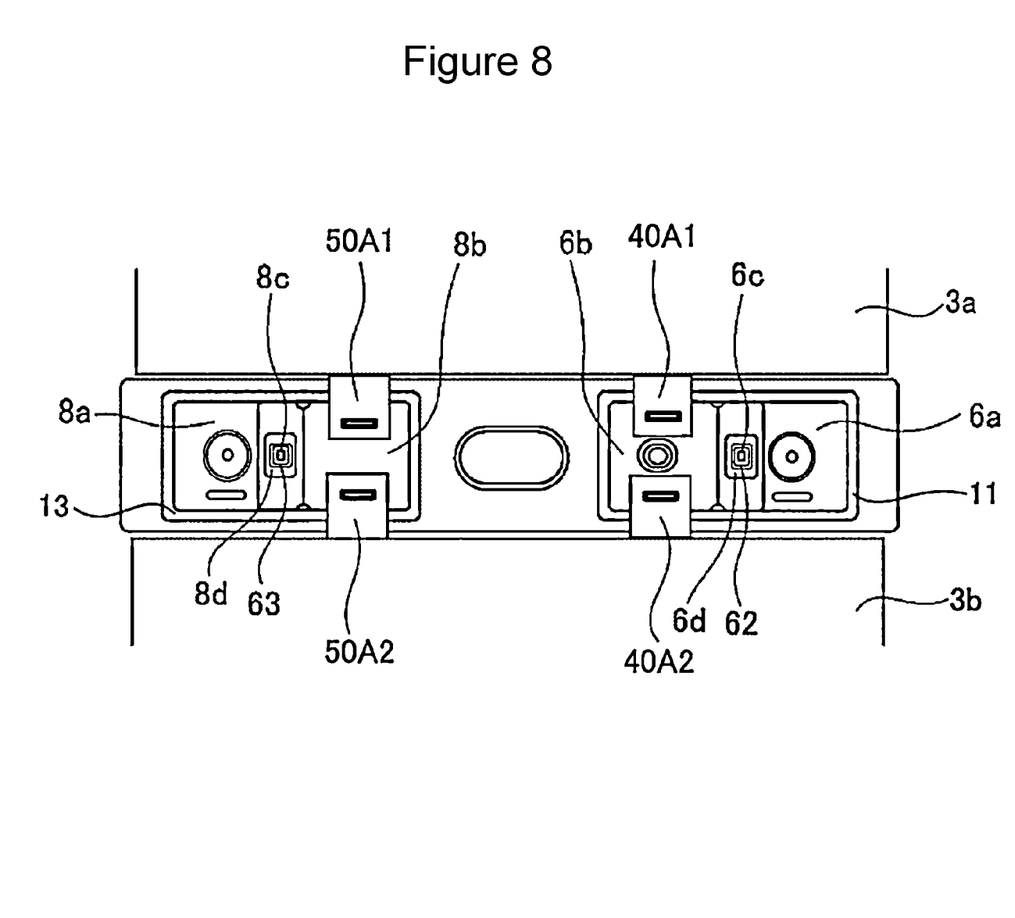
FIG. 8 illustrates the surface of the sealing plate facing the electrode assembly after the second positive-electrode current collector is attached to the first positive-electrode current collector and the second negative-electrode current collector is attached to the first negative-electrode current collector.

FIG. 8 illustrates the surface of the sealing plate 2 facing the inside of the battery after the second positive-electrode current collector 6b is attached to the first positive-electrode current collector 6a and the second negative-electrode current collector 8b is attached to the first negative-electrode current collector 8a.

The second positive-electrode current collector 6b to which the first and second positive-electrode tab groups 40A1 and 40A2 are connected is placed on the inner insulating member 11 so that the second positive-electrode current collector 6b partially overlaps the first positive-electrode current collector 6a. Then, the thin portion 6c is irradiated with a laser beam to weld the second positive-electrode current collector 6b and the first positive-electrode current collector 6a together, so that a welded connection portion 62 is formed. In addition, the second negative-electrode current collector 8b to which the first and second negative-electrode tab groups 50A1 and 50A2 are connected is placed on the inner insulating member 13 so that the second negative-electrode current collector 8b partially overlaps the first negative-electrode current collector 8a. Then, the thin portion 8c is irradiated with a laser beam to weld the second negative-electrode current collector 8b and the first negative-electrode current collector 8a together, so that a welded connection portion 63 is formed.

[Production of Secondary Battery]

The two positive-electrode tab groups 40A1 and 40A2 and the two negative-electrode tab groups 50A1 and 50A2 are bent so that the upper surface of the first electrode assembly element 3a and the upper surface of the second electrode assembly element 3b in FIG. 8 come into contact with each other directly or with another component interposed therebetween. Thus, the two electrode assembly elements 3a and 3b are brought together. Then, the two electrode assembly elements 3a and 3b are placed in the electrode assembly holder 14 composed of an insulating sheet formed in the shape of a box or a bag.

The first positive-electrode tab group 40A1 and the second positive-electrode tab group 40A2 are bent in different directions. The first negative-electrode tab group 50A1 and the second negative-electrode tab group 50A2 are bent in different directions.

The two electrode assembly elements 3a and 3b covered with the electrode assembly holder 14 are inserted into the rectangular exterior body 1. Then, the sealing plate 2 and the rectangular exterior body 1 are welded together to seal the opening in the rectangular exterior body 1 with the sealing plate 2. Then, electrolytic solution is introduced into the rectangular exterior body 1 through the electrolytic solution introduction hole 15 in the sealing plate 2. After that, the electrolytic solution introduction hole 15 is sealed with a sealing member, such as a blind rivet. Thus, the rectangular secondary battery 20 is completed.

<Attachment of Porous Bodies to Electrode Assembly and Electrode Assembly Elements>

Figure 9:
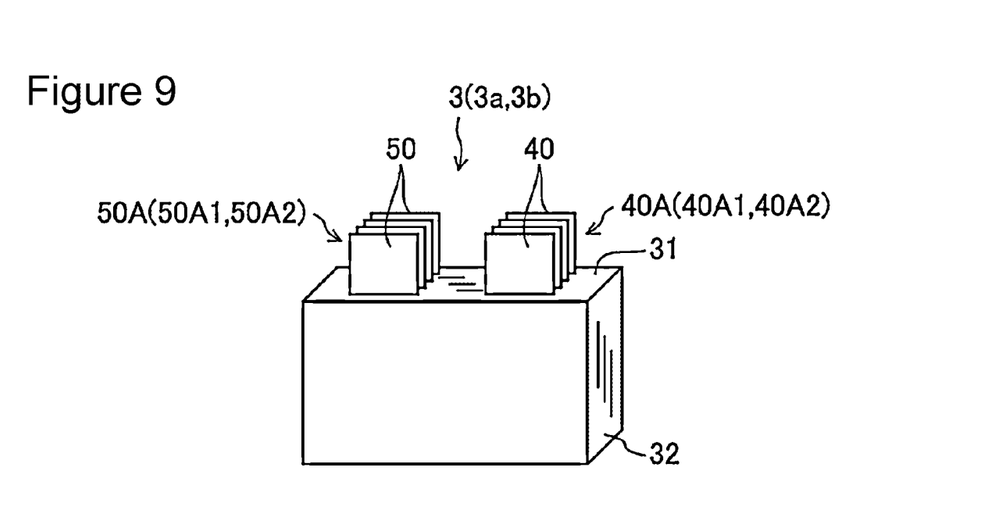
FIG. 9 is a schematic perspective view of an electrode assembly.

In the present embodiment, as illustrated in FIG. 9, the electrode assembly 3 (first and second electrode assembly elements 3a and 3b) has four stack end surfaces. As illustrated in FIG. 8 and described above in the [Production of Secondary Battery] section, a first end surface 31 from which the positive-electrode tabs 40 and the negative-electrode tabs 50 project face the sealing plate 2. The positive-electrode tabs 40 are stacked together to form the positive-electrode tab groups 40A (first positive-electrode tab group 40A1 and second positive-electrode tab group 40A2), and are welded to the second positive-electrode current collector 6b (FIG. 6). Similarly, the negative-electrode tabs 50 are stacked together to form the negative-electrode tab groups 50A (first negative-electrode tab group 50A1 and second negative-electrode tab group 50A2), and are welded to the second negative-electrode current collector 8b.

The inventors of the present invention have studied and found that when the above-described components are welded, dusting occurs and a large amount of metal powder (foreign matter) is generated. Therefore, when the electrode assembly 3 illustrated in FIG. 9 is welded, as it is, to the second positive-electrode current collector 6b and the second negative-electrode current collector 8b, metal powder adheres to the second positive-electrode current collector 6b, portions of the positive-electrode tab groups 40A near the second positive-electrode current collector 6b, the second negative-electrode current collector 8b, and portions of the negative-electrode tab group 50A near the second negative-electrode current collector 8b.

When electrolytic solution is introduced after that, the metal powder is pushed into the electrode assembly 3 by the electrolytic solution, and internal short-circuiting may occur as a result.

In particular, when the numbers of positive electrode plates 4 and negative electrode plates 5 included in the electrode assembly 3 (first and second electrode assembly elements 3a and 3b) are increased to increase the output of the battery, the number of positive-electrode tabs 40 included in the positive-electrode tab groups 40A (first positive-electrode tab group 40A1 and second positive-electrode tab group 40A2) and the number of negative-electrode tabs 50 included in the negative-electrode tab groups 50A (first negative-electrode tab group 50A1 and second negative-electrode tab group 50A2) are also increased. Therefore, the welding output for welding them to the second positive-electrode current collector 6b and the second negative-electrode current collector 8b needs to be increased. As the welding output is increased, a greater amount of metal powder is generated. As a result, the risk of internal short-circuiting is increased.

Figure 10:
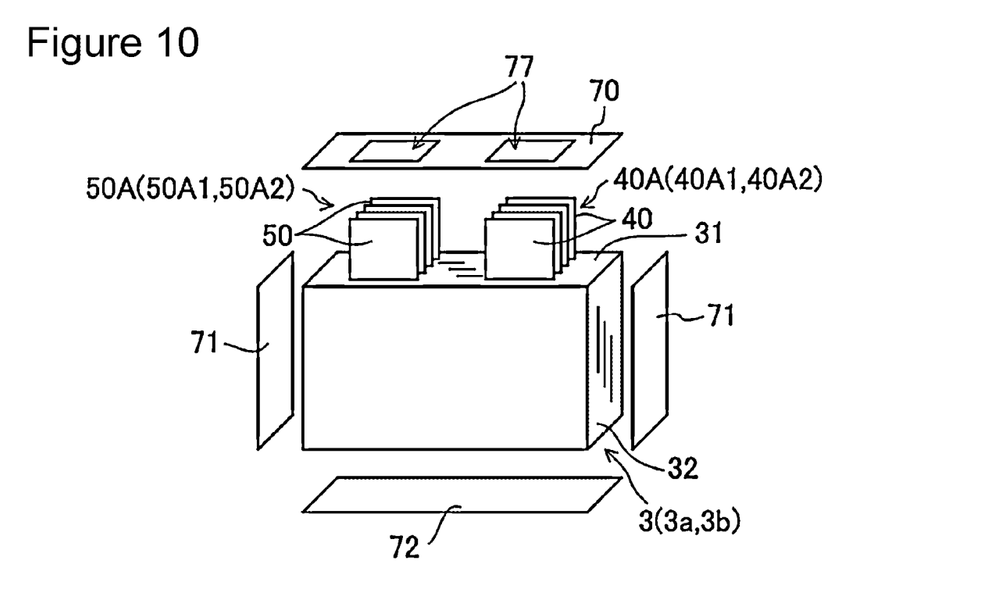
FIG. 10 is a schematic perspective view of the electrode assembly and capturing members according to the embodiment.

Accordingly, in the present embodiment, as illustrated in FIG. 10, capturing members 70, 71, and 72 made of nonwoven fabric, which are electrically insulating porous bodies, are arranged to cover stack end surfaces (first end surface 31, second end surfaces 32, and third end surface), which are surfaces of the electrode assembly 3 at which end surfaces of the positive electrode plates 4 and the negative electrode plates 5 are exposed and that are parallel to the direction in which the positive electrode plates 4 and the negative electrode plates 5 are stacked. In this case, the capturing members 70, 71, and 72 are preferably fixed to the stack end surfaces with an adhesive or adhesive tape. The capturing members 70, 71, and 72 may be fixed either by bonding the capturing members 70, 71, and 72 to the stack end surfaces or by bonding the capturing members 70, 71, and 72 to the surfaces of the outermost layers of the electrode assembly 3 having the stacked structure. Since the positive-electrode tab group 40A and the negative-electrode tab group 50A project from the first end surface 31, the first capturing member 70 has holes 77 and 77 for allowing the positive-electrode tab group 40A and the negative-electrode tab group 50A to extend therethrough.

In the case where the capturing members 70, 71, and 72 are arranged as described above, the capturing members 70, 71, and 72 that cover the first, second, and third end surfaces 31 and 32 capture the metal powder generated when the positive-electrode tab groups 40A are welded to the second positive-electrode current collector 6b and when the negative-electrode tab groups 50A are welded to the second negative-electrode current collector 8b. Thus, adhesion of the metal powder to the first, second, and third end surfaces 31 and 32 can be prevented.

At the time when assembly of the rectangular secondary battery 20 is completed, the first capturing member 70 is disposed between the first end surface 31 and the second positive-electrode current collector 6b and between the first end surface 31 and the second negative-electrode current collector 8b. When the electrolytic solution is introduced, the metal powder remains captured in the pores in the first capturing member 70, the second capturing member 71, and the third capturing member 72, and does not enter the electrode assembly 3. Thus, internal short-circuiting due to the metal powder can be prevented.

The structure may instead be such that only the first capturing member 70 is provided and that the second capturing members 71 and the third capturing member 72 are omitted.

The first capturing member 70 is preferably disposed on the end surface of each of the first electrode assembly element 3a and the second electrode assembly element 3b before the positive-electrode tab groups 40A are welded to the second positive-electrode current collector 6b and before the negative-electrode tab groups 50A are welded to the second negative-electrode current collector 8b.

The first capturing member 70 provided on the end surface of the first electrode assembly element 3a and the first capturing member 70 provided on the end surface of the second electrode assembly element 3b are preferably separate independent components. In addition, each first capturing member 70 preferably has holes for allowing the corresponding positive-electrode tab group 40A and the corresponding negative-electrode tab group 50A to extend therethrough.

The average pore diameter of the non-woven fabric (porous body) that forms each of the capturing members 70, 71, and 72 is not particularly limited as long as foreign matter, such as metal foreign matter, can be captured, but is preferably in the range of greater than or equal to 20 μm and less than or equal to 100 μm. In particular, metal foreign matter that enters the rectangular secondary battery 20 and causes short-circuiting and degradation in performance of the battery typically has a size of about 20 μm. Therefore, when the average pore diameter of the porous body is less than 20 μm, it may be difficult to capture the metal foreign matter. When the average pore diameter of the porous body is greater than 100 μm, it may be difficult to retain the captured metal foreign matter in the porous body. The average pore diameter of the porous body is determined by measuring the diameters of any ten pores on an image by SEM measurement and calculating the average of the diameters of the ten pores.

The non-woven fabric is preferably formed of electrically insulating fibers, for example, fibers made of a resin such as polyester, polyolefin, polyamide, polyurethane, or polystyrene, glass fibers, ceramic fibers, or cellulose fibers, and may be manufactured by a known method.

Second Embodiment

A battery according to a second embodiment includes a capturing member having a shape different from that in ti first embodiment, and other structures are the same as those in the first embodiment. The difference from the first embodiment will now be described.

Figure 11:
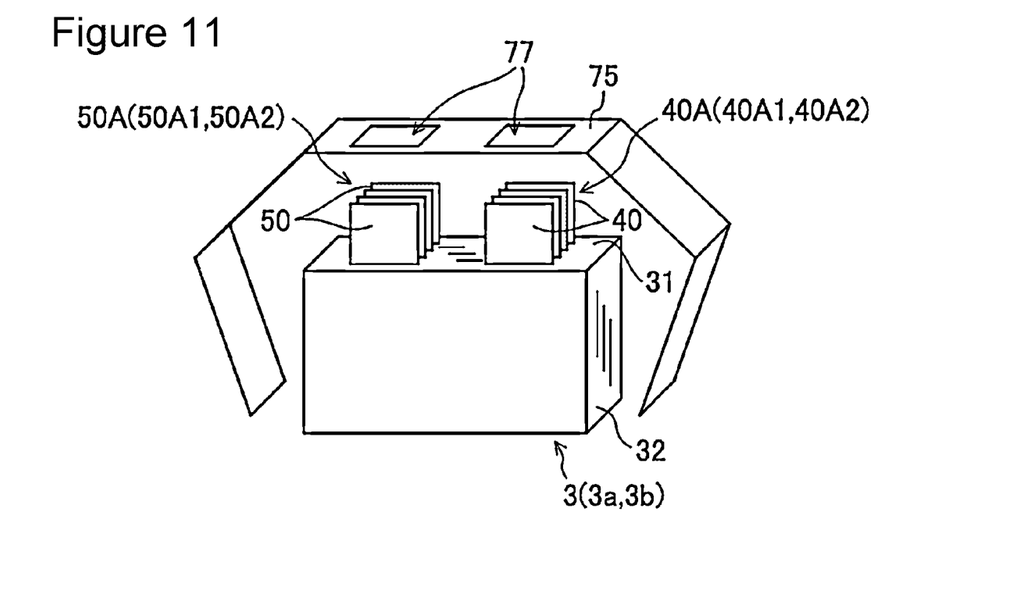
FIG. 11 is a schematic perspective view of the electrode assembly and a capturing member according to another embodiment.

FIG. 11 illustrates the shape of a capturing member 75 according to the present embodiment. In the first embodiment, the four stack end surfaces are individually provided with respective ones of the capturing members 70, 71, and 72. In contrast, in the present embodiment, a single band-shaped capturing member 75 is provided to continuously cover the four stack end surfaces. More specifically, for example, the single capturing member 75 is disposed to cover the first end surface 31, bent to cover the second end surfaces 32, and further bent to cover the third end surface. Similar to the first embodiment, the portion that covers the first end surface 31 has holes 77 and 77 for allowing the positive-electrode tab group 40A and the negative-electrode tab group 50A to extend therethrough.

In the present embodiment, the capturing member 75 can be more easily attached to the electrode assembly 3 than in the first embodiment. The effects of the first embodiment can also be obtained in the second embodiment.

Third Embodiment

The battery according to a third embodiment includes capturing members having shapes different from those in the first embodiment, and other structures are the same as those in the first embodiment. The difference from the first embodiment will now be described.

Figure 12:
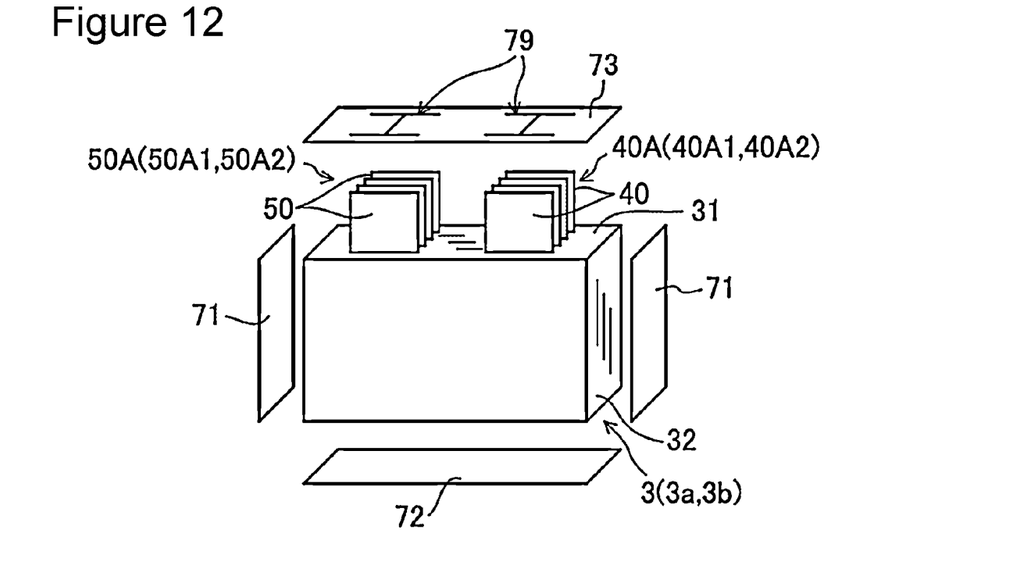
FIG. 12 is a schematic perspective view of the electrode assembly and capturing members according to another embodiment.

FIG. 12 illustrates the shapes of capturing members 71, 72, and 73 according to the present embodiment. The second capturing members 71 and the third capturing member 72 are the same as those in the first embodiment. The first capturing member 73 differs from that in the first embodiment. More specifically, the first capturing member 73 according to the present embodiment does not have the holes 77 and 77 for allowing the positive-electrode tab group 40A and the negative-electrode tab group 50A to extend therethrough, but instead has cuts 79 having the shape of the letter 'H'.

The length of the portions of each cut corresponding to the vertical lines of the letter 'H' is substantially equal to the width of the positive-electrode tabs 40 and the negative-electrode tabs 50, and the length of the portion of each cut corresponding to the horizontal line of the letter 'H' is substantially equal to the width of the positive-electrode tab group 40A and the negative-electrode tab group 50A in the stacking direction.

The first capturing member 73 according to the present embodiment includes two tongue-shaped non-woven fabric portions on both sides of the portion of each cut corresponding to the horizontal line of the letter 'H'. The two tongue-shaped non-woven fabric portions are disposed on respective side portions of a corresponding one of the positive-electrode tab group 40A and the negative-electrode tab group 50A (portions at which the sides of the positive-electrode tabs 40 or the negative-electrode tabs 50 included therein are aligned), and cover the side portions. Accordingly, foreign matter, such as metal powder, is prevented from entering the spaces between adjacent positive-electrode tabs 40 and 40 or between adjacent negative-electrode tabs 50 and 50 through the side portions.

According to the present embodiment, entry of foreign matter into the electrode assembly 3 can be prevented more reliably than in the first embodiment.

Other Embodiments

The above-described embodiments are examples of the present invention, and the present invention is not limited to these examples. The examples may be combined with or partially replaced by well-known techniques, commonly used techniques, or publicly known techniques. Modification inventions that can be easily arrived at by a person skilled in the art are also included in the present invention.

The electrode assembly may have a structure obtained by winding a positive electrode plate, a negative electrode plate, and a separator that are stacked together. The electrode assembly elements may also have a winding structure.

Although two electrode assembly elements are disposed in the exterior body in the above-described embodiments, the number of electrode assembly elements may instead be one or three or more.

Although the positive-electrode current collector and the negative-electrode current collector are each composed of two components in the above-described embodiments, the positive-electrode current collector and the negative-electrode current collector may instead be composed of a single component.

The positive electrode plates, the negative electrode plates, the separators, the electrolyte, etc. may be made of known materials.

The electrically insulating porous body that constitutes each capturing member is not limited to non-woven fabric, and may instead be, for example, a porous polymer film made of a polyolefin-based resin, a fluorine-based resin, etc., or a sheet made of an inorganic material, for example, a ceramic material such as zeolite, zirconia, silica, alumina, or titania.

The capturing member is disposed to cover at least the first end surface. Preferably, the capturing member is disposed to additionally cover the second end surfaces.

REFERENCE SIGNS LIST 1 rectangular exterior body (exterior body)
2 sealing plate
3 electrode assembly
3a first electrode assembly element
3b second electrode assembly element
4 positive electrode plate
5 negative electrode plate
6a first positive-electrode current collector
6b second positive-electrode current collector
7 positive-electrode terminal (positive-electrode external terminal)
8a first negative-electrode current collector
8b second negative-electrode current collector
9 negative-electrode terminal (negative-electrode external terminal)
14 electrode assembly holder (insulating sheet)
15 electrolytic solution introduction hole
20 rectangular secondary battery (battery)
31 first end surface (one of surfaces of electrode assembly that are parallel to the direction in which positive electrode plates and negative electrode plates are stacked)
32 second end surface (another one of surfaces of electrode assembly that are parallel to the direction in which positive electrode plates and negative electrode plates are stacked)
40 positive-electrode tab
40A positive-electrode tab group
40A1 first positive-electrode tab group
40A2 second positive-electrode tab group
50 negative-electrode tab
50A negative-electrode tab group
50A1 first negative-electrode tab group
50A2 second negative-electrode tab group
60, 61, 62, 63 welded connection portion
70, 73 first capturing member (porous body)
71 second capturing member (porous body)
72 third capturing member (porous body)
75 capturing member (porous body)

The invention claimed is:

1. A battery comprising:
an electrode assembly including a positive electrode plate and a negative electrode plate that are stacked together with a separator interposed therebetween;
an exterior body that has an opening and contains the electrode assembly;
a sealing plate that seals the opening; and
a positive-electrode external terminal and a negative-electrode external terminal that are attached to the sealing plate,
wherein the sealing plate has an introduction hole through which electrolytic solution is introduced into the exterior body,
wherein the electrode assembly has surfaces parallel to a stacking direction in which the positive electrode plate and the negative electrode plate are stacked, the surfaces including one surface that faces the sealing plate,
wherein the positive electrode plate includes a positive-electrode tab that is adjacent to the one surface and protrudes from the one surface, the positive-electrode tab being electrically connected to the positive-electrode external terminal through a positive-electrode current collector disposed between the electrode assembly and the sealing plate,
wherein the negative electrode plate includes a negative-electrode tab that is adjacent to the one surface and protrudes from the one surface, the negative-electrode tab being electrically connected to the negative-electrode external terminal through a negative-electrode current collector disposed between the electrode assembly and the sealing plate,
wherein the positive-electrode tab is welded to the positive-electrode current collector,
wherein the negative-electrode tab is welded to the negative-electrode current collector,
wherein a porous body that is electrically insulative is disposed between the one surface and the positive-electrode current collector and between the one surface and the negative-electrode current collector,
wherein the porous body is located between the positive-electrode tab and the negative-electrode tab and is fixed to the one surface surrounding the positive-electrode tab and surrounding the negative-electrode tab,
wherein the porous body directly contacts side edge portions of the or each positive-electrode tab and the or each negative-electrode tab that protrude from the one surface, and
wherein the electrode assembly further includes a pair of major surfaces each perpendicular to the stacking direction,
wherein the porous body is not disposed on the pair of major surfaces.

2. The battery according to claim 1, wherein the porous body is also disposed on another one or more of the surfaces of the electrode assembly that are parallel to the direction in which the positive electrode plate and the negative electrode plate are stacked.

3. The battery according to claim 1, wherein the electrode assembly includes a first electrode assembly element including the positive electrode plate and the negative electrode plate and a second electrode assembly element including the positive electrode plate and the negative electrode plate,
wherein the first electrode assembly element includes a first positive-electrode tab group including a plurality of the positive-electrode tabs and a first negative-electrode tab group including a plurality of the negative-electrode tabs, wherein the second electrode assembly element includes a second positive-electrode tab group including a plurality of the positive-electrode tabs and a second negative-electrode tab group including a plurality of the negative-electrode tabs, wherein the first positive-electrode tab group and the second positive-electrode tab group are each welded to the positive-electrode current collector, wherein the first negative-electrode tab group and the second negative-electrode tab group are each welded to the negative-electrode current collector, and wherein the porous body provided on a surface of the first electrode assembly element that forms the one surface and the porous body provided on a surface of the second electrode assembly element that forms the one surface are different from each other.

4. The battery according to claim 1, wherein an insulating sheet is disposed between the exterior body and the electrode assembly.

5. The battery according to claim 1, wherein the porous body is made of non-woven fabric.

6. The battery according to claim 1, wherein the porous body is directly bonded to a portion of the one surface surrounding the positive-electrode tab and surrounding the negative-electrode tab, said portion being located between the positive-electrode tab and the negative-electrode tab.

7. The battery according to claim 3, wherein the porous body is fixed to the one surface surrounding all of the first positive-electrode tab group and the second positive-electrode tab group and surrounding all of the first negative-electrode tab group and the second negative-electrode tab group.

8. The battery according to claim 1, wherein the porous body has a pore that has an average pore diameter in the range of greater than or equal to 20 μm and less than or equal to 100 μm.

9. The battery according to claim 1,
wherein the surfaces parallel to the stacking direction include:
a pair of first end surfaces opposite each other and including the one surface, and
a pair of second end surfaces opposite each other and extending between the pair of first end surfaces,
wherein the porous body is further disposed on at least one of the pair of first end surfaces and the pair of second end surfaces, in addition to the one surface.

* * * * *